United States Patent
Liu et al.

(10) Patent No.: US 9,788,178 B2
(45) Date of Patent: Oct. 10, 2017

(54) METHOD FOR ACQUIRING RECOMMENDING INFORMATION, TERMINAL, AND SERVER

(71) Applicant: Xiaomi Inc., Beijing (CN)

(72) Inventors: Huiyun Liu, Beijing (CN); Guangjian Wang, Beijing (CN); Zhiyong Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/867,851

(22) Filed: Sep. 28, 2015

(65) Prior Publication Data

US 2016/0150388 A1 May 26, 2016

Related U.S. Application Data

(63) Continuation of application No. PCT/CN2015/078016, filed on Apr. 30, 2015.

(30) Foreign Application Priority Data

Nov. 25, 2014 (CN) .......................... 2014 1 0685768

(51) Int. Cl.
  *H04W 8/16* (2009.01)
  *H04W 4/16* (2009.01)
  *H04M 1/57* (2006.01)

(52) U.S. Cl.
  CPC ............. *H04W 4/16* (2013.01); *H04M 1/575* (2013.01)

(58) Field of Classification Search
  CPC .............................. H04M 3/4931; H04W 4/16
  See application file for complete search history.

(56) References Cited

U.S. PATENT DOCUMENTS

2007/0123235 A1* 5/2007 Newport ............. H04M 3/4931
  455/414.2
2008/0255977 A1* 10/2008 Altberg ............. G06F 17/30979
  705/35
(Continued)

FOREIGN PATENT DOCUMENTS

CN  101686542 A  3/2010
CN  102752392 A  10/2012
(Continued)

OTHER PUBLICATIONS

Office Action for Japanese Application No. 2016-561069 dated Feb. 28, 2017, 5 pages.
(Continued)

*Primary Examiner* — Asghar Bilgrami

(57) ABSTRACT

A method for acquiring recommending information, a terminal and a server are provided. In the method, a first terminal receives a second telephone number affiliated with a second terminal sent by a recommender using a third terminal. The first terminal sends a request for recommending information to a server according to the first telephone number of the first terminal, a telephone number of the recommender, and the second telephone number, so that the server generates recommending information according to the request for recommending information, and pushes the recommending information to the second terminal affiliated with the second telephone number.

12 Claims, 15 Drawing Sheets

(56) References Cited

U.S. PATENT DOCUMENTS

| | | | | |
|---|---|---|---|---|
| 2009/0086720 A1* | 4/2009 | Westlake | ............... | H04L 12/66 |
| | | | | 370/352 |
| 2010/0222033 A1* | 9/2010 | Scott | ................. | H04M 3/5322 |
| | | | | 455/414.1 |
| 2010/0278321 A1* | 11/2010 | Sharp | ................ | H04M 3/4878 |
| | | | | 379/88.22 |
| 2013/0318199 A1* | 11/2013 | Le Jouan | ............... | H04L 67/02 |
| | | | | 709/217 |
| 2014/0280097 A1* | 9/2014 | Lee | ...................... | G06Q 50/01 |
| | | | | 707/723 |
| 2016/0307172 A1* | 10/2016 | He | ...................... | G06Q 30/02 |

FOREIGN PATENT DOCUMENTS

| | | |
|---|---|---|
| CN | 102932761 A | 2/2013 |
| CN | 103916526 A | 7/2014 |
| CN | 104539812 A | 4/2015 |
| JP | 2001309019 A | 11/2001 |
| JP | 2012105018 A | 5/2012 |
| RU | 2013106924 A | 8/2014 |
| WO | WO 2012069548 A1 | 5/2012 |

OTHER PUBLICATIONS

Office Action for Russian Application No. 2015133793/07 dated Dec. 19, 2016, 8 pages.

International Search Report dated Sep. 2, 2015 for International Application No. PCT/CN2015/078016, 4 pages.

* cited by examiner

METHOD FOR ACQUIRING RECOMMENDING INFORMATION, TERMINAL, AND SERVER

CROSS-REFERENCE TO RELATED APPLICATIONS

This application is a continuation of International Application No. PCT/CN2015/078016 with an international filing date of Apr. 30, 2015, which is based upon and claims priority to Chinese Patent Application No. 201410685768.7, filed Nov. 25, 2014, the entire contents of which are incorporated herein by reference.

TECHNICAL FIELD

The present disclosure relates to the field of communication technologies, and more particularly, to a method for acquiring recommending information, a terminal and a server.

BACKGROUND

With the development of communication technologies, more and more people use terminals for communications. To extend social circles, terminal users will frequently recommend each other. For example, a user B recommends the contact information of a user C to a user A. When the user C receives a call from the user A, since the user C does not know in advance that the telephone number of itself is recommended by the user B, and the user C does not store the contact information of the user A; therefore, the user C will consider the call from the user A as an unknown call. Consequently, estrangement may exist during the communication between the user C and the user of the unknown call.

SUMMARY

The present disclosure provides a method for acquiring recommending information, a terminal and a server.

According to a first aspect of the present disclosure, there is provided a method for acquiring recommending information. In the method, a first terminal affiliated with a first telephone number receives a second telephone number affiliated with a second terminal sent by a recommender using a third terminal. The first terminal sends a request for recommending information to a server according to a first telephone number of the terminal, a telephone number of the recommender, and the second telephone number, so that the server generates recommending information according to the request for recommending information, and pushes the recommending information to the second terminal affiliated with the second telephone number.

According to a second aspect of the present disclosure, there is provided a method for acquiring recommending information. The method may include: receiving a request for recommending information, and generating recommending information according to the request for recommending information, the recommending information being configured to indicate that a recommender recommends a second telephone number to a terminal affiliated with a first telephone number; and sending the recommending information to a second terminal corresponding to the second telephone number according to the second telephone number in the recommending information.

According to a third aspect of the present disclosure, there is provided a method for acquiring recommending information, applied in a terminal. The method may include: when receiving an unknown call, determining whether a local information database includes designated recommending information corresponding to the unknown call, the information database being configured to store recommending information sent by a server, and the designated recommending information being configured to indicate that a recommender recommends a second telephone number used by the terminal to a terminal affiliated with a first telephone number; and when the information database includes the designated recommending information, performing prompting as to the unknown call according to the designated recommending information.

According to a fourth aspect of the present disclosure, there is provided a terminal. The terminal may include: a processor; and a memory for storing instructions executable by the processor. The processor is configured to perform: receiving a second telephone number sent by a recommender; and sending a request for recommending information to a server according to a first telephone number of the terminal, a telephone number of the recommender and the second telephone number, so that the server generates recommending information according to the request for recommending information, and pushes the recommending information to a terminal affiliated with the second telephone number.

According to an fifth aspect of the present disclosure, there is provided a server. The server may include: a processor; and a memory for storing instructions executable by the processor. The processor is configured to perform: receiving a request for recommending information, and generating recommending information according to the request for recommending information, the recommending information being configured to indicate that a recommender recommends a second telephone number to a terminal affiliated with a first telephone number; and sending the recommending information to a second terminal corresponding to the second telephone number according to the second telephone number in the recommending information.

According to a sixth aspect of the present disclosure, there is provided a terminal. The terminal may include: a processor; and a memory for storing instructions executable by the processor. The processor is configured to perform: when receiving an unknown call, determining whether a local information database includes designated recommending information corresponding to the unknown call, the information database being configured to store recommending information sent by a server, and the designated recommending information being configured to indicate that a recommender recommends a second telephone number used by the terminal to a terminal affiliated with a first telephone number; and when the information database includes the designated recommending information, performing prompting as to the unknown call according to the designated recommending information.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodi

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Figure 1:
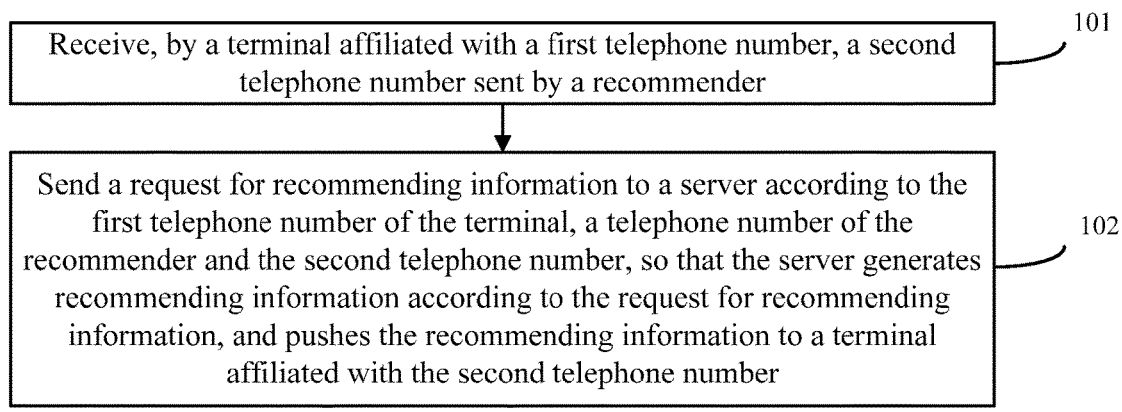
- FIG. 1 is a flow chart of a method for acquiring recommending information according to an exemplary embodiment.

FIG. 1 is a flow chart of a method for acquiring recommending information according to an exemplary embodiment. The method for acquiring recommending information is applied in a terminal. As shown in FIG. 1, the method for acquiring recommending information may include the following steps.

In step 101, a second telephone number sent by a recommender is received by a terminal affiliated with a first telephone number. The recommender may send the second telephone number to the terminal using short text message, e-mail, or other types of messaging applications.

In step 102, a request for recommending information is sent to a server according to the first telephone number of the terminal, a telephone number of the recommender, and the second telephone number, so that the server generates recommending information according to the request for recommending information, and pushes the recommending information to a terminal affiliated with the second telephone number.

According to the method provided by embodiments of the present disclosure, the second telephone number sent by the recommender is received, and the request for recommending information is sent to the server according to the first telephone number of the terminal, the telephone number of the recommender and the second telephone number, so that the server generates the recommending information according to the request for recommending information, and pushes the recommending information to the terminal affiliated with the second telephone number. Since the terminal affiliated with the second telephone number may perform prompting as to a current incoming call according to the recommending information, a user can conveniently communicate with a user of the unknown call. Therefore, the prompting as to incoming call has better flexibility, and better effects are obtained.

As an optional embodiment, the receiving of the second telephone number sent by the recommender includes: when receiving a short message sent by the recommender, performing telephone number identification on the short message; and when obtaining a telephone number via the identification, taking the telephone number extracted and identified from the short message as the second telephone number.

As an optional embodiment, the receiving of the second telephone number sent by the recommender includes: when receiving an application message, performing telephone number identification on the application message; and when obtaining a telephone number via the identification, taking the telephone number extracted and identified from the short message as the second telephone number.

The method further includes: acquiring a telephone number bound to a user account from which the application message is sent, and taking the acquired telephone number as the telephone number of the recommender.

As an optional embodiment, before sending the request for recommending information to the server, the method further includes:

sending a query request including at least the second telephone number to the server to make the server query whether a user corresponding to the second telephone number is an online user according to the query request and return a query result; and if the query result is that the user corresponding to the second telephone number is an online user, performing the step of sending the recommending information to the server.

As an optional embodiment, the method further includes: when detecting a dialing request to the second telephone number in a current display page, performing the step of sending the request for recommending information to the server.

As an optional embodiment, the method further includes: sending expiry time corresponding to the request for recommending information to the server, so that the server determines whether the request for recommending information is expired according to the expiry time, and removes the request for recommending information when the request for recommending information is expired.

Any combination of all the optional technical solutions above may be employed to form optional embodiments of the present disclosure, which will not be elaborated one by one herein.

Figure 2:
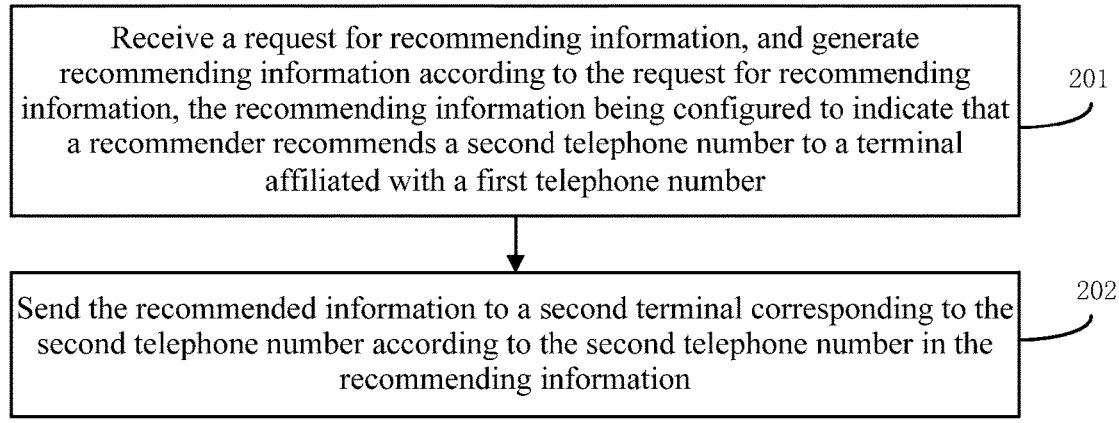
FIG. 2 is a flow chart of a method for acquiring recommending information according to an exemplary embodiment.

FIG. 2 is a flow chart of a method for acquiring recommending information according to an exemplary embodiment. The method for acquiring recommending information is applied in a server. As shown in FIG. 2, the method for acquiring recommending information may include the following steps.

In step 201, a request for recommending information is received, and recommending information is generated according to the request for recommending information. The recommending information is configured to indicate that a recommender recommends a second telephone number to a terminal affiliated with a first telephone number. For example, the server may receive the request from a terminal affiliated with a second telephone number.

In step 202, the recommending information is sent to a second terminal corresponding to the second telephone number according to the second telephone number in the recommending information.

According to the method provided by embodiments of the present disclosure, the request for recommending information is received, and the recommending information is generated according to the request for recommending information. The recommending information is sent to the second terminal corresponding to the second telephone number according to the second telephone number in the recommending information. Since the second terminal may perform prompting as to a current incoming call according to the recommending information, a user can conveniently communicate with a user of an unknown call. Therefore, the prompting as to an incoming call has better flexibility, and better effects are obtained.

As an optional embodiment, the receiving of the request for recommending information includes: receiving the request for recommending information sent by a first terminal corresponding to the first telephone number; or, receiving the request for recommending information sent by a third terminal corresponding to a telephone number of the recommender. For example, the first terminal may send the request to the server when the user dials the second telephone number affiliated with the second terminal. The third terminal may send the request to the server when the user sends a message to the second terminal, where the message includes the second telephone number affiliated with the second terminal.

As an optional embodiment, before receiving the request for recommending information sent by the first terminal corresponding to the first telephone number, the method further includes:

receiving a query request sent by the first terminal corresponding to the first telephone number, the query request including at least the second telephone number; and querying whether a user corresponding to the second telephone number is an online user according to the second telephone number in the query request, and returning a query result to the first terminal to make the first terminal return the request for recommending information after the first terminal determining that the user corresponding to the second telephone number is an online user.

Any combination of all the optional technical solutions above may be employed to form optional embodiments of the present disclosure, which will not be elaborated one by one herein.

Figure 3:
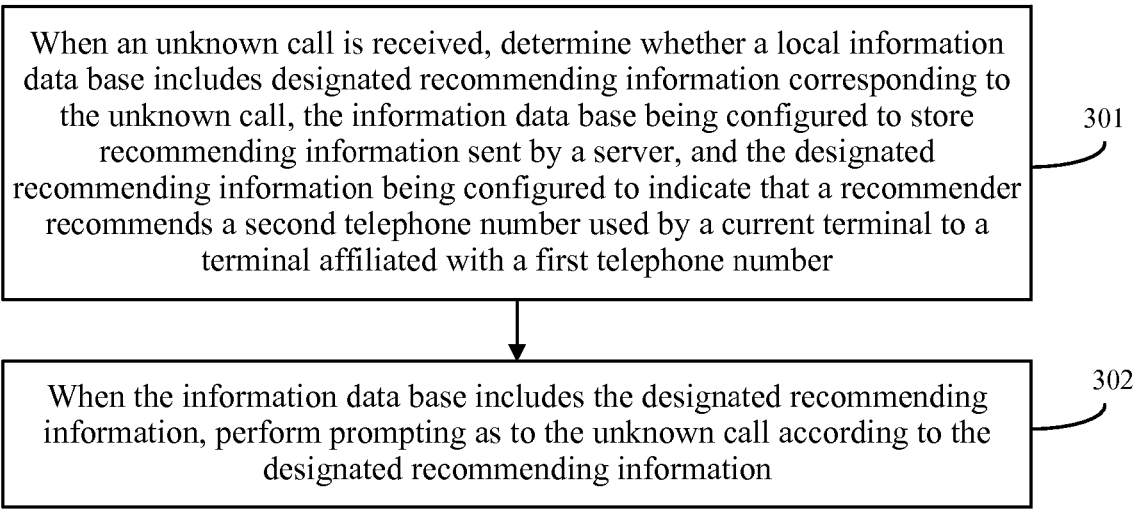
FIG. 3 is a flow chart of a method for acquiring recommending information according to an exemplary embodiment.

FIG. 3 is a flow chart of a method for acquiring recommending information according to an exemplary embodiment. The method for acquiring recommending information is applied in a terminal. As shown in FIG. 3, the method for acquiring recommending information may include the following steps.

In step 301, when an unknown call is received, the terminal may determine whether a local information database includes designated recommending information corresponding to the unknown call. The information database is configured to store recommending information sent by a server, and the designated recommending information is configured to indicate that a recommender recommends a second telephone number used by the current terminal to a terminal affiliated with a first telephone number. For example, the current terminal is affiliated with the second telephone number and the current terminal may receive the unknown call that includes a first telephone number affiliated with an unknown terminal.

In step 302, when the information database includes the designated recommending information, prompting as to the unknown call is performed according to the designated recommending information.

According to the method provided by embodiments of the present disclosure, when an unknown call is received, the current terminal affiliated with the second telephone number determines whether the local information database includes the designated recommending information corresponding to the unknown call. When the information database includes the designated recommending information, the current terminal may prompt as to the unknown call according to the designated recommending information. Since prompting as to a current incoming call may be performed according to the recommending information, a user of the current terminal may conveniently communicate with the user of the unknown terminal corresponding to the unknown call. Therefore, the prompting as to incoming call has better flexibility, and better effects are obtained.

As an optional embodiment, performing prompting as to the unknown call according to the designated recommending information includes:

determining whether the recommender in the designated recommending information is in a local contact list according to a telephone number of the recommender in the designated recommending information; and when the recommender in the designated recommending information is in the local contact list, performing prompting as to the unknown call according to information of the recommender.

As an optional embodiment, before determining whether the local information database includes the designated recommending information corresponding to the unknown call, the method further includes:

receiving the recommending information sent by the server, and searching whether a telephone number of the recommender in the recommending information is stored in a local contact list; and if the telephone number of the recommender in the recommending information is stored in the local contact list, storing the recommending information in the local information database.

As an optional embodiment, before storing the recommending information in the local information database, the method further includes:

acquiring expiry time corresponding to the recommending information; and the storing of the recommending information in the local information database includes:

storing the recommending information and the expiry time corresponding to the recommending information in the local information database.

As an optional embodiment, after storing the recommending information and the expiry time corresponding to the recommending information in the local information database, the method further includes:

determining whether the recommending information is expired according to the expiry time corresponding to the recommending information; and if the recommending information is expired, removing the recommending information and the expiry time corresponding to the recommending information from the local information database.

As an optional embodiment, after performing prompting as to the unknown call according to the designated recommending information, the method further includes:

if detecting that the first telephone number in the recommending information is stored in a local contact list, removing the recommending information from the information database.

Any combination of all the optional technical solutions above may be employed to form optional embodiments of the present disclosure, which will not be elaborated one by one herein.

Figure 4:
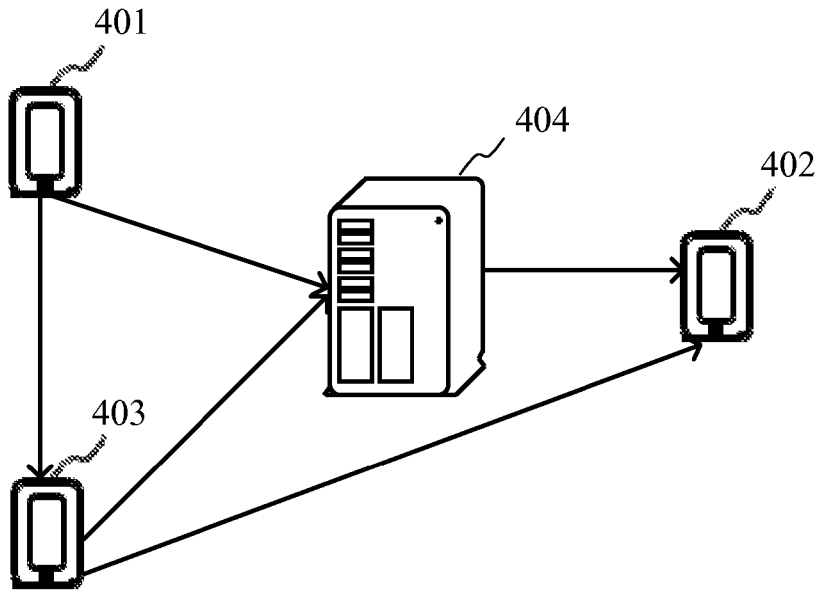
FIG. 4 is a block diagram showing an implementation environment of a method for acquiring recommending information according to an exemplary embodiment.

FIG. 4 shows a block diagram of an implementation environment related to a method provided by an exemplary embodiment of the present disclosure. As shown in FIG. 4, the implementation environment includes a first terminal 401, a second terminal 402, a third terminal 403, and a server 404. The first terminal 401, the second terminal 402 and the third terminal 403 may be devices such as a smartphone. A terminal corresponding to a first telephone number is the first terminal 401, a terminal corresponding to a second telephone number is the second terminal 402, and a terminal corresponding to a telephone number of a recommender is the third terminal 403, and the present embodiment does not impose specific limitations on this. A user using the third terminal 403 may recommend the telephone number of a user using the second terminal 402 to a user using the first terminal 401. Through the implementation environment as shown in FIG. 4, the first terminal 401, the second terminal 402, the third terminal 403, and the server 404 may communicate with each other through networks.

For purposes of convenience in description, FIG. 4 only shows the first terminal 401, the second terminal 402, the third terminal 403, and the server 404. The first terminal 401, the second terminal 402, and the third terminal 403 represent one terminal among a plurality of terminals, respectively. The embodiments of the present disclosure will be illustrated hereinafter by realizing prompting as to an incoming call through the information interaction among the first terminal 401, the second terminal 402, the third terminal 403, and the server 404.

Figure 5:
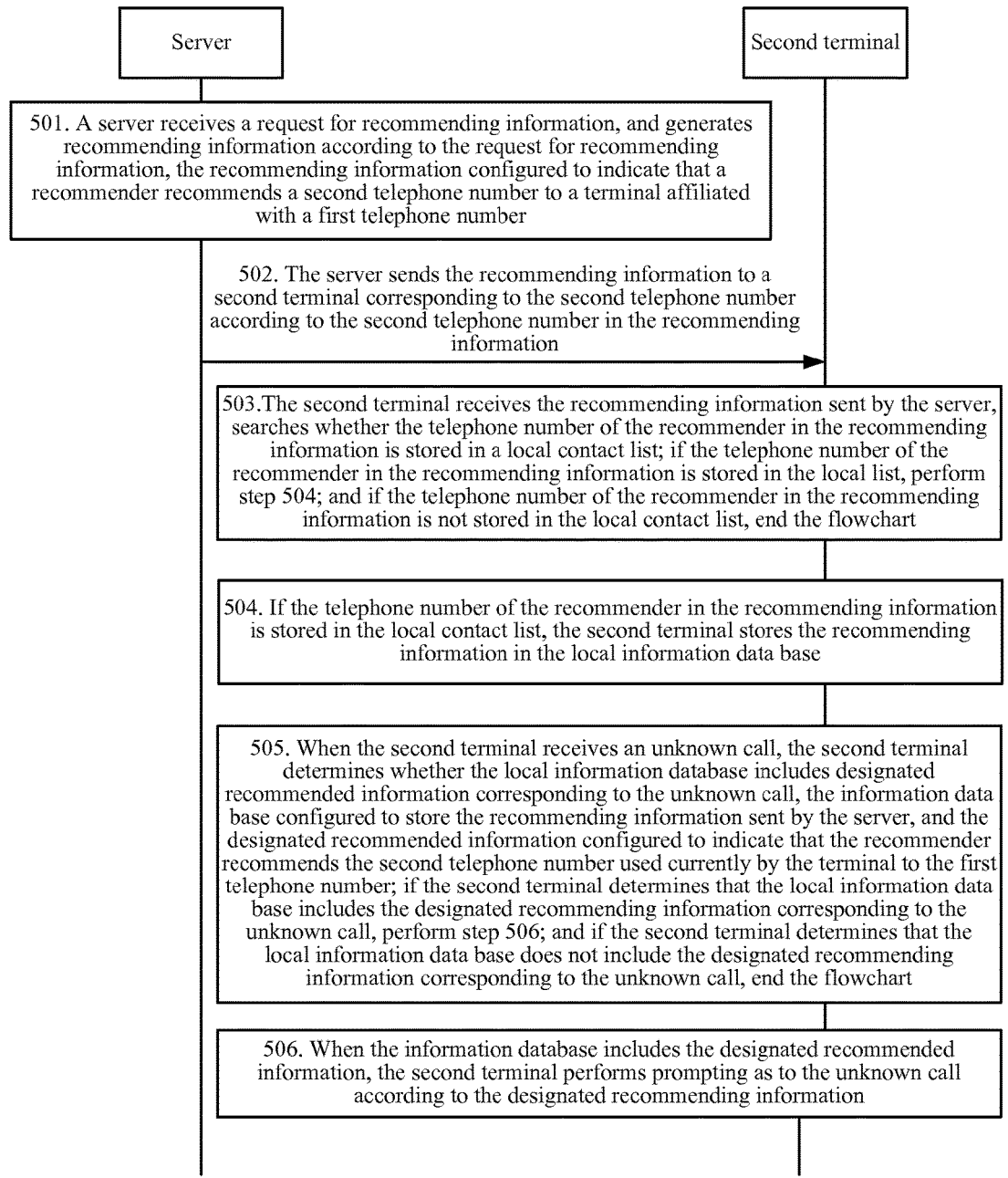
FIG. 5 is a flow chart of a method for acquiring recommending information according to an exemplary embodiment.

With reference to the above embodiment and the implementation environment as shown in FIG. 4, FIG. 5 shows a flow chart of a method for acquiring recommending information according to an exemplary embodiment. As shown in FIG. 5, the method for acquiring recommending information is applied in a terminal, and the method includes the following steps.

In step 501, a server receives a request for recommending information, and generates recommending information according to the request for recommending information. The recommending information is configured to indicate that a recommender recommends a second telephone number to a terminal affiliated with a first telephone number.

Before the server receives the request for recommending information, a recommender may recommend a second telephone number to a user corresponding to a first telephone number. For example, the recommender is a user B, the user corresponding to the first telephone number is a user A, and the user corresponding to the second telephone number is a user C, and then the user B may recommend the telephone number of the user C to the user A.

The manners for the recommender recommending the second telephone number to the user corresponding to the first telephone number will not be specifically defined in the embodiment, and the manners include but not limited to: recommending the second telephone number to the user corresponding to the first telephone number through an application message, wherein the application message includes the second telephone number. Or, a short message including the second telephone number may also be sent to the user corresponding to the first telephone number, thus recommending the second telephone number to the user corresponding to the first telephone number.

Accordingly, the first terminal corresponding to the first telephone number may receive the second telephone number sent by the recommender. The manners for the first terminal corresponding to the first telephone number receiving the second telephone number sent by the recommender will not be specifically defined in the embodiment, and the manners include but not limited to: when receiving a short message sent by the recommender, performing telephone number identification on the short message; and when obtaining a telephone number via the identification, taking the telephone number extracted and identified from the short message as the second telephone number; or, when receiving an application message, performing telephone number identification on the application message; and when obtaining a telephone number via the identification, taking the telephone number extracted and identified from the application message as the second telephone number.

It should be noted that the first terminal may acquire a telephone number from which the short message is sent, when the short message sent by the recommender is received, and the present embodiment does not impose specific limitations on this. Or, when receiving the application message sent by the recommender, the first terminal may acquire a telephone number bound to an user account from which the application message is sent, and take the acquired telephone number as the telephone number of the recommender, and the present embodiment does not impose specific limitations on this. When the recommender sends the application message to the first terminal, the recommender sends the application message to the first terminal through an application account number; therefore, the first terminal cannot directly acquire the telephone number of the recommender. Thus, the first terminal may send a request for acquiring telephone number to the server, and the server, after receiving the request for acquiring telephone number, returns the telephone number to the first terminal, so that the first terminal takes the received telephone number as the telephone number of the recommender.

Moreover, after the recommender recommends the second telephone number to the user corresponding to the first telephone number, the recommender may also send a message to the user corresponding to the second telephone number, so as to prompt the user corresponding to the second telephone number that the telephone number of the user corresponding to the second telephone number has already been recommended to the user corresponding to the first telephone number, and the present embodiment does not impose specific limitations on this. For instance, the recommender is the user B, the user corresponding to the first telephone number is the user A, and the user corresponding to the second telephone number is the user C. The user B, after recommending the telephone number of the user C to the user A, may send the following message to the user C: "I have already recommended your telephone number to the user A", so that the user C, after receiving the message sent by the user B, can confirm that the telephone number of himself/herself has already been known by the user A.

The manners for the server receiving the request for recommending information will not be specifically defined in the embodiment, and the manners include but not limited to: receiving the request for recommending information sent by a first terminal corresponding to the first telephone number; or, receiving the request for recommending information sent by a third terminal corresponding to the telephone number of the recommender.

For instance, the recommender is the user B, the user corresponding to the first telephone number is the user A, and the user corresponding to the second telephone number is the user C. After the user B recommends the telephone number of the user C to the user A, for example, after the user B sends a short message including the telephone number of the user C to the user A, the third terminal corresponding to the user B may send a request for recommending information to the server, so that the server may receive the request for recommending information sent by the third terminal corresponding to the telephone number of the recommender. Or, after the user A receives the telephone number of the user C recommended by the user B, for example, after the user A receives the short message including the telephone number of the user C sent by the user B, the first terminal corresponding to the user A may send a request for recommending information to the server, so that the server may receive the request for recommending information sent by the first terminal corresponding to the first telephone number.

The request for recommending information may include the telephone number of the recommender, the first telephone number and the second telephone number. For instance, the recommender is the user B, the user corresponding to the first telephone number is the user A, and the user corresponding to the second telephone number is the user C. The request for recommending information may include the telephone number of the user B, the telephone number of the user A and the telephone number of the user C, and the format of the request for recommending information may be {B, {A}, C}, and the formats of the request for recommending information will not be specifically defined in the embodiment.

It should be noted that the request for recommending information received by the server may either be sent by the first terminal corresponding to the first telephone number, or sent by the third terminal corresponding to the telephone number of the recommender. When the request for recommending information is sent by the third terminal corresponding to the telephone number of the recommender, since the recommender may possibly recommend the second telephone number to multiple users, the telephone numbers of multiple users receiving the recommended telephone number may possibly be included in the request for recommending information sent by the third terminal corresponding to the telephone number of the recommender, and the present embodiment does not impose specific limitations on this. For instance, after the user B recommends the telephone number of the user C to the user A, a user D and a user E, the third terminal corresponding to the user B may send a request for recommending information in a format of {B, {A, D, E}, C} to the server.

The first terminal may send the request for recommending information to the server according to the first telephone number of the first terminal, the telephone number of the recommender and the second telephone number, and the manners for the first terminal sending the request for recommending information to the server will not be specifically defined in the embodiment. The first terminal may send the request for recommending information to the server when detecting a dialing request to the second telephone number in a current display page, and the timing for the first terminal sending the request for recommending information to the server will not be specifically defined in the embodiment.

The third terminal may send the request for recommending information to the server according to the telephone number of the recommender, the first telephone number and the second telephone number, and the manners for the third terminal sending the request for recommending information to the server will not be specifically defined in the embodiment.

Moreover, when the user corresponding to the second telephone number is an online user, the server can send the recommending information to the second terminal corresponding to the second telephone number subsequently. Therefore, before the server receives the request for recommending information sent by the first terminal corresponding to the first telephone number, the first terminal may send a query request to the server. The server may receive the query request sent by the first terminal corresponding to the first telephone number, and determine whether the user corresponding to the second telephone number is an online user according to the second telephone number in the query request, and thus return a query result to the first terminal, and the present embodiment does not impose specific limitations on this. The query request includes at least the second telephone number, and the contents of the query request will not be specifically defined in the embodiment.

After receiving the query result returned by the server, if the query result is that the user corresponding to the second telephone number is an online user, the first terminal performs the step of sending the recommending information to the server. The server may determine a user account associated with the second telephone number, and determine whether the user is an online user according to the login conditions of the user account. For example, the server may determine whether the user account associated with the second telephone number is logged in currently or has been logged in within recent one month, and the like. If the user account is logged in currently or has been logged in within recent one month, then the user is determined as an online user.

Or, before the server receives the request for recommending information sent by the third terminal corresponding to the telephone number of the recommender, the server may receive a query request sent by the third terminal corresponding to the telephone number of the recommender. The query request includes at least the second telephone number. The server may determine whether the user corresponding to the second telephone number is an online user according to the second telephone number in the query request, and return a query result to the third terminal. After receiving the query result returned by the server, if the user corresponding to the second telephone number is an online user, the third terminal may perform the step of returning the request for recommending information to the server.

It should be noted that the first terminal may also send expiry time corresponding to the request for recommending information to the server, and the present embodiment does not impose specific limitations on this. After receiving the expiry time sent by the first terminal, the server may determine whether corresponding request for recommending information is expired according to the expiry time. When the request for recommending information is expired, the request for recommending information is removed. Since the expired request for recommending information can be removed according to the expiry time, over occupation of the storage space of the server due to storage of too many requests of recommending information can be avoided, and thereby the storage space of the server is saved.

The manners for the server generating the recommending information according to the request for recommending information will not be specifically defined in the embodiment, and the manners include but not limited to: determining the first telephone number, the telephone number of the recommender and the second telephone number according to the request for recommending information; and generating the recommending information according to the first telephone number, the telephone number of the recommender and the second telephone number. For example, the telephone number of the recommender is B, the first telephone number is A, and the second telephone number is C. Corresponding recommending information generated by the server may be {B, {A}, C}.

In step 502, the server sends the recommending information to the second terminal corresponding to the second telephone number according to the second telephone number in the recommending information.

The manners for the server sending the recommending information to the second terminal corresponding to the second telephone number according to the second telephone number in the recommending information will not be specifically defined in the embodiment, the manners include but not limited to: sending the recommending information to the second terminal corresponding to the second telephone number through a network in a form of data packet. The data packet includes the recommending information.

In step 503, the second terminal receives the recommending information sent by the server, searches whether the telephone number of the recommender in the recommending information is stored in a local contact list. If the telephone number of the recommender in the recommending information is stored in the local contact list, then step 504 is performed. If the telephone number of the recommender in the recommending information is not stored in the local contact list, then the flowchart is ended.

Since subsequent steps cannot be performed unless the recommender is a contact of the user corresponding to the second terminal, the second terminal, after receiving the recommending information sent by the server, needs to search whether the telephone number of the recommender in the recommending information is stored in the local contact list, and thereby determines whether the recommender is a contact of the user corresponding to the second terminal. When the second terminal searches whether the telephone number of the recommender in the recommending information is stored in the local contact list, if the telephone number of the recommender in the recommending information is not stored in the local contact list, it indicates that the recommender is not a contact of the user corresponding to the second telephone number. Therefore, the recommending information can be deemed invalid information and then removed, and meanwhile the flowchart is ended, and the present embodiment does not impose specific limitations on this.

In step 504, if the telephone number of the recommender in the recommending information is stored in the local contact list, the second terminal stores the recommending information in a local information database.

In order to save local storage resources, expiry time corresponding to the recommending information can be acquired when the second terminal stores the recommending information to the local information database. Accordingly, when storing the recommending information to the local information database, the recommending information and the expiry time corresponding to the recommending information may be stored in the local information database, and the present embodiment does not impose specific limitations on this. Based on the above contents, the second terminal may determine whether the recommending information is expired according to the expiry time corresponding to the recommending information. If the recommending information is expired, then the recommending information and the expiry time corresponding to the recommending information are removed from the local information database, and the present embodiment does not impose specific limitations on this. For example, the recommending information is {B, {A}, C}. Then, the expiry time corresponding to the recommending information may be stored in the following forms, such as {B, {A}, C, t}. After this piece of recommending information is stored, timing may be started from the storing moment. When the accumulated time period exceeds the expiry time t, for instance, the time period exceeds 10 days, then the recommending information is determined as expired, and the recommending information and the expiry time corresponding to the recommending information {B, {A}, C, t} are removed from the local information database.

It should be noted that the process in the above steps 501 to 504 is the process for the second terminal storing the information database including the recommending information locally. Through the locally stored information database, when the second terminal receives an incoming call, the second terminal may perform prompting as to an incoming call according to the information database. The specific process is as shown in the following steps.

In step 505, when the second terminal receives an unknown call, the second terminal determines whether the local information database includes designated recommending information corresponding to the unknown call. The information database is configured to store the recommending information sent by the server, and the designated recommending information is configured to indicate that the recommender recommends the second telephone number used by the current terminal to the first telephone number. If the second terminal determines that the local information database includes the designated recommending information corresponding to the unknown call, then step 506 is performed. If the second terminal determines that the local information database does not include the designated recommending information corresponding to the unknown call, then the flowchart is ended.

After receiving an incoming call, the second terminal may search whether the calling number is stored in the local contact list. When the calling number is in the local contact list, it indicates that a user corresponding to the calling number is a contact of the user using the second terminal. At this moment, prompting as the incoming call can be performed according to normal flows. When the calling number is not stored in the local contact list, it indicates that the user corresponding to the calling number is not a contact of the user using the second terminal. At this moment, the call received by the user using the second terminal is an unknown call. The method provided by the embodiment mainly explains the situation where the incoming call is an unknown call. In embodiments of the present disclosure, the telephone number corresponding to the unknown call is the first telephone number.

Based on the contents in the above step 501, the manners for the second terminal determine whether the local information database includes the designated recommending information corresponding to the unknown call will not be specifically defined in the embodiment, and the manners include but not limited to: determining whether the recommending information including the first telephone number is stored in the local information database.

For instance, three pieces of recommending information are stored in the local information database, and the user corresponding to the first telephone number is the user A. The three pieces of recommending information are {B, {A}, C}, {B, {D}, C} and {E, {F}, C}, respectively. Since the recommending information {B, {A}, C} in the local information database includes the telephone number of the user A, i.e., the recommending information includes the first telephone number, and thus the recommending information {B, {A}, C} may be determined as the designated recommending information, i.e., the local information database includes the designated recommending information. When the following two pieces of recommending information are stored in the local information database: {B, {D}, C} and {E, {F}, C}, for example, then it may be determined that the local information database does not include the designated recommending information according to the above determination process.

If the second terminal determines that the local information database includes the designated recommending information corresponding to the unknown call, then it indicates that the user corresponding to the unknown call acquires the second telephone number corresponding to the second terminal through the recommendation of a contact of the user corresponding to the second terminal. At this moment, step 506 may be continuously performed. If the second terminal determines that the local information database does not include the designated recommending information corresponding to the unknown call, then it indicates that the user corresponding to the unknown call is not recommended by a contact of the user corresponding to the second terminal. At this moment, the second terminal can perform prompting as to the unknown call using an ordinary manner, and meanwhile the flowchart is ended.

In step 506, when the information database includes the designated recommending information, the second terminal performs prompting as to the unknown call according to the designated recommending information.

The manners for performing prompting as to the unknown call according to the designated recommending information will not be specifically defined in the embodiment, the manners include but not limited to: determining whether the recommender in the designated recommending information is in a local contact list according to the telephone number of the recommender in the designated recommending information; and when the recommender in the designated recommending information is in the local contact list, performing prompting as to the unknown call according to the information of the recommender.

Since the designated recommending information includes the telephone number of the recommender and subsequent prompting as to an incoming call needs to be performed according to the information of the recommender in the local contact list, the second terminal needs to determine whether the recommender in the designated recommending information is in the local contact list. The manners for performing prompting as to the unknown call according to the information of the recommender will not be specifically defined in the embodiment, the manners include but not limited to: generating a corresponding prompting text according to the information of the recommender; and displaying the prompting text to perform prompting as to the current incoming call. Rather, prompting as to the current incoming call may be performed using such manners as voice prompting, picture prompting, and the like, and the present embodiment does not impose specific limitations on this.

Figure 6:
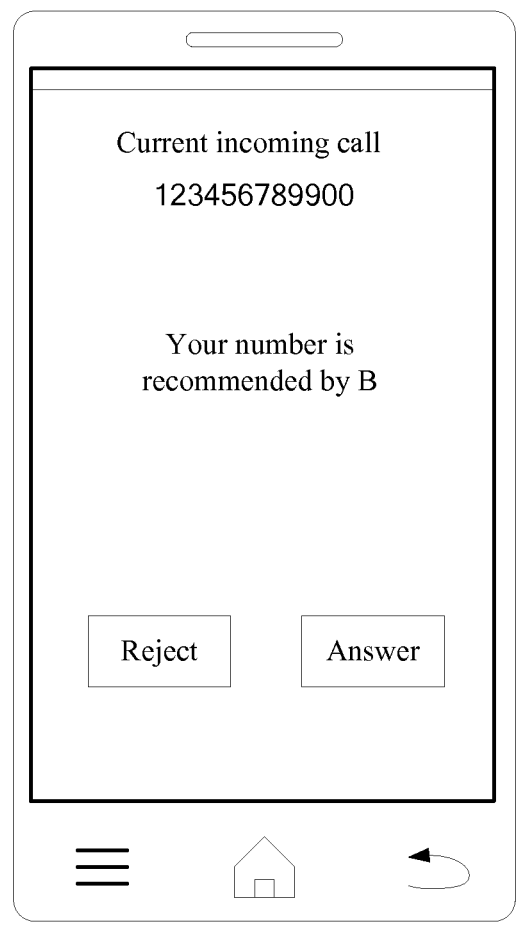
FIG. 6 is a block diagram showing an interface for performing prompting as to an incoming call according to an exemplary embodiment.

For instance, the information of the recommender is the name of the recommender, and the name of the recommender is B. The following prompting text may be generated according to the information of the recommender: "Your number is recommended by B", so that the prompting text may be displayed in a display screen of the second terminal when an unknown call is received. Specific display effects are shown in FIG. 6.

Moreover, the user corresponding to the first telephone number is not an unknown user any longer to the user of the second terminal when the first telephone number corresponding to the unknown call is stored in the local contact list of the second terminal. For example, the telephone number recommending information {B, {A}, C} is stored in the local information database, and when the user C receives a call from the user A, the user C may not know the user A since the telephone number of the user A is not stored in the local contact list; thus, the second terminal used by the user C will perform prompting as to the unknown call according to the foregoing process. When the telephone number of the user A is stored in the local contact list by the user C, then the user A is not an unknown user any longer to the user C.

Therefore, after performing of prompting as to the unknown call according to the designated recommending information, if it is that the first telephone number in the recommending information is stored in the local contact list, the recommending information is removed from the local contact list, the present embodiment does not impose specific limitations on this. For instance, in the foregoing examples, after the telephone number of the user A is stored in the local contact list, the second terminal may remove the telephone number recommending information {B, {A}, C} from the local information database.

It should be noted: it may be known from the foregoing step 502 that, since the telephone numbers of multiple users receiving the recommended telephone number may be stored in the recommending information, for example, {B, {A, D, E}, C}, the recommending information can be removed after it is detected that the telephone numbers of multiple users receiving the recommended telephone number in the recommending information are stored in the local contact list at the same time. For example, after it is detected that the telephone numbers of the user A, the user D and the user E are stored in the local contact list at the same time, the recommending information {B, {A, D, E}, C} may be removed from the local information database.

Figure 7:
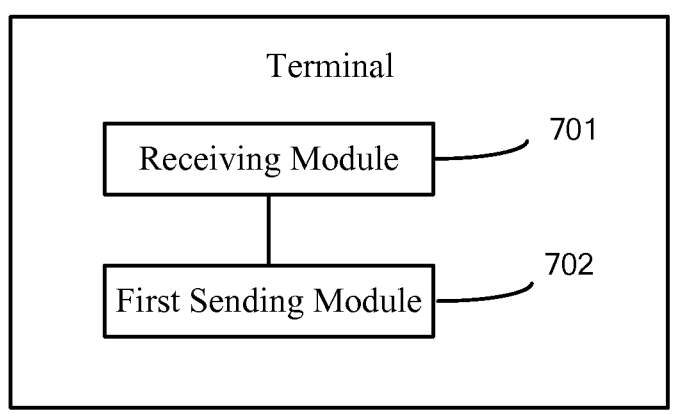
FIG. 7 is a block diagram of a terminal according to an exemplary embodiment.

According to the method provided by embodiments of the present disclosure, when the second terminal receives an unknown call, whether the local information database includes the designated recommending information corresponding to the unknown call is determined, and when the information database includes the designated recommending information, prompting as to the unknown call is performed according to the designated recommending information. Since prompting as to a current incoming call may be performed according to the recommending information, a user can conveniently communicate with a user of the unknown call. Therefore, the prompting as to incoming call has better flexibility, and better effects are obtained FIG. 7 is a block diagram of a terminal according to an exemplary embodiment. Referring to FIG. 7, the terminal includes a receiving module 701 and a first sending module 702.

The receiving module 701 is configured to receive a second telephone number sent by a recommender.

The first sending module 702 is configured to send a request for recommending information to a server according to a first telephone number of the terminal, a telephone number of the recommender and the second telephone number, so that the server generates recommending information according to the request for recommending information, and pushes the recommending information to a terminal affiliated with the second telephone number.

In one embodiment, the receiving module 701 is configured to, when a short message sent by the recommender is received, perform telephone number identification on the short message; and when a telephone number is obtained via the identification, take the telephone number extracted and identified from the short message as the second telephone number.

In one embodiment, the receiving module 701 is configured to, when an application message sent is received, perform telephone number identification on the application message; and when a telephone number is obtained via the identification, take the telephone number extracted and identified from the application message as the second telephone number.

Figure 8:
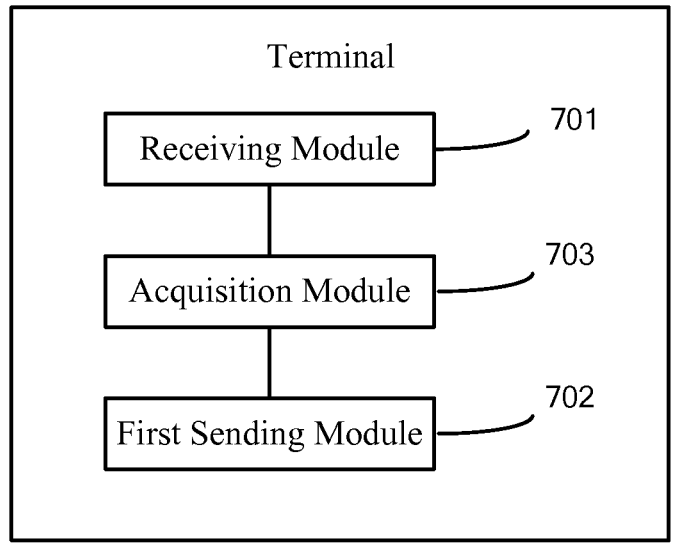
FIG. 8 is a block diagram of a terminal according to an exemplary embodiment.

Referring to FIG. 8, the terminal may further include an acquisition module 703.

The acquisition module 703 is configured to acquire a telephone number bound to a user account from which the application message is sent, and take the acquired telephone number as the telephone number of the recommender.

Figure 9:
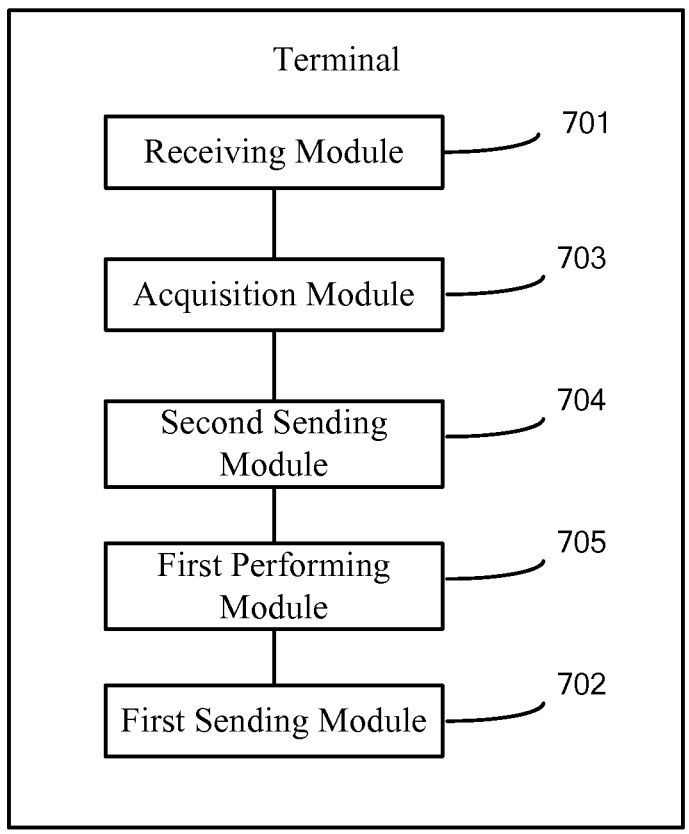
FIG. 9 is a block diagram of a terminal according to an exemplary embodiment.

In one embodiment, referring to FIG. 9, the terminal further includes a second sending module 704 and a first performing module 705.

The second sending module 704 is configured to send a query request including at least the second telephone number to the server to make the server query whether a user corresponding to the second telephone number is an online user according to the query request and return a query result.

The first performing module 705 is configured to, when the query result is that the user corresponding to the second telephone number is an online user, perform the step of sending the recommending information to the server.

Figure 10:
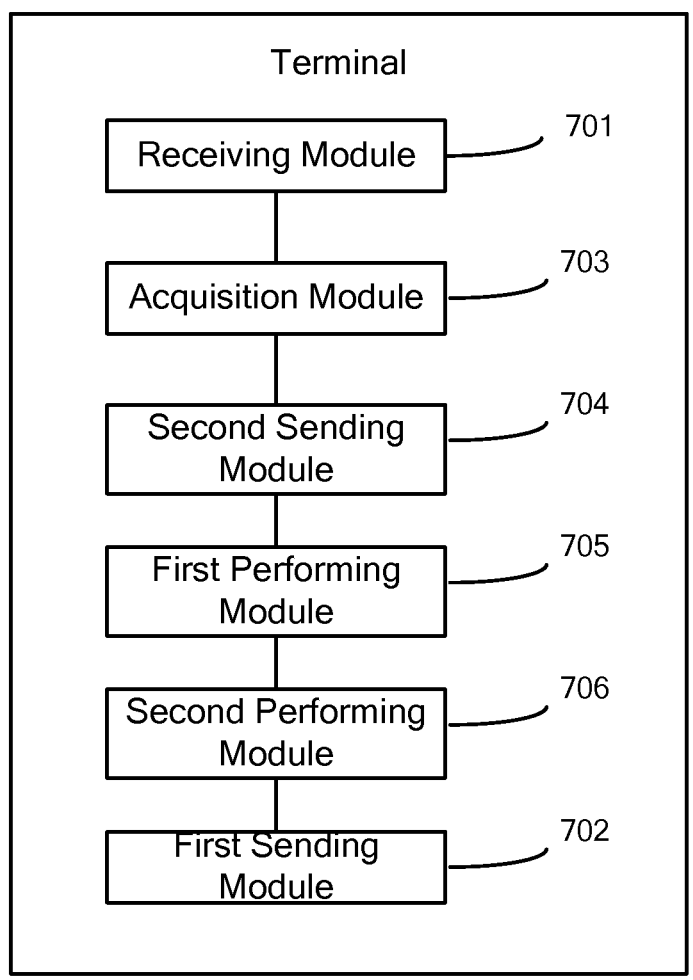
FIG. 10 is a block diagram of a terminal according to an exemplary embodiment.

In one embodiment, referring to FIG. 10, the terminal may further include a second performing module 706.

The second performing module 706 is configured to, when a dialing request to the second telephone number in a current display page is detected, perform the step of sending the request for recommending information to the server.

Figure 11:
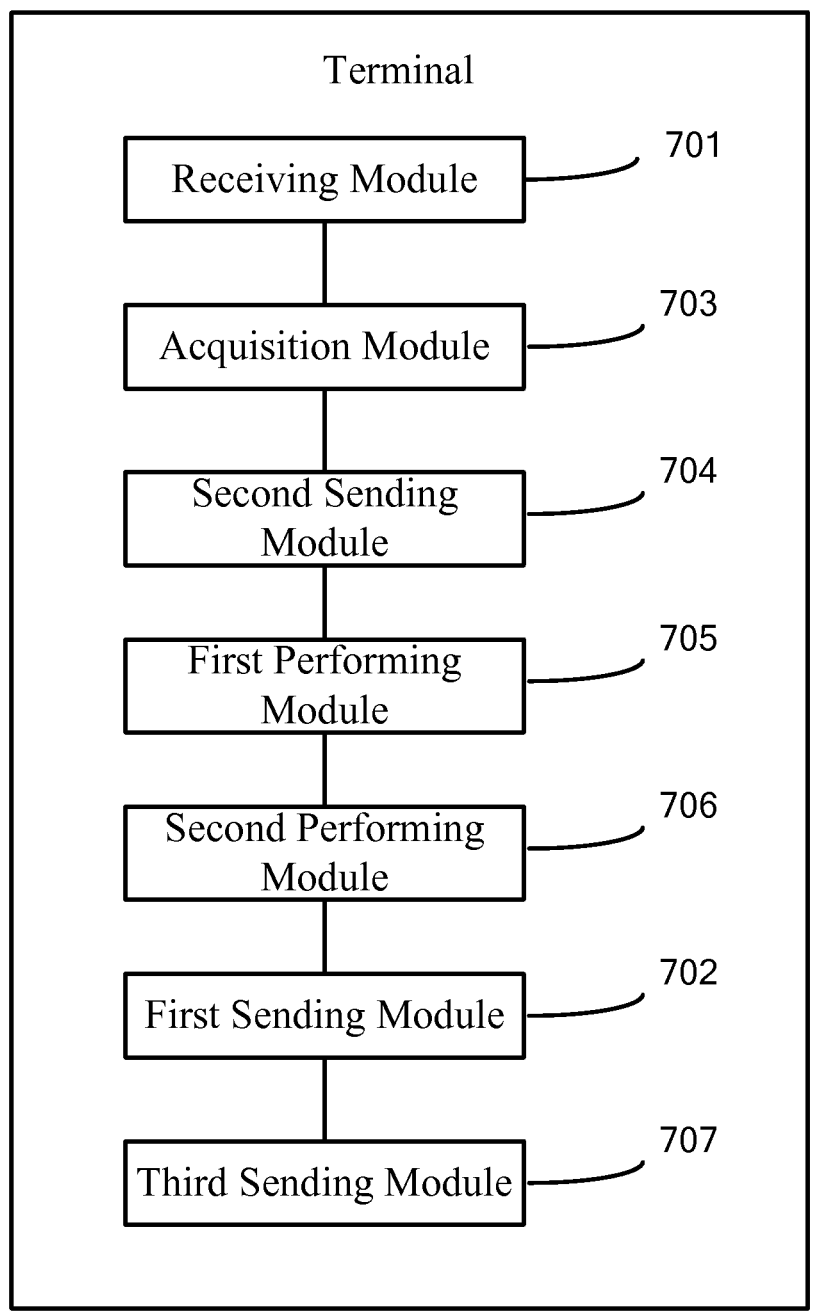
FIG. 11 is a block diagram of a terminal according to an exemplary embodiment.

In one embodiment, referring to FIG. 11, the terminal may further include a third sending module 707.

The third sending module 707 is configured to send expiry time corresponding to the request for recommending information to the server, so that the server determines whether the request for recommending information is expired according to the expiry time, and removes the request for recommending information when the request for recommending information is expired.

According to the terminal provided by embodiments of the present disclosure, the second telephone number sent by the recommender is received, and the request for recommending information is sent to the server according to the first telephone number of the terminal, the telephone number of recommender and the second telephone number, so that the server generates the recommending information according to the request for recommending information, and pushes the recommending information to the terminal affiliated with the second telephone number. Since the terminal affiliated with the second telephone number may perform prompting as to a current incoming call according to the recommending information, a user can conveniently communicate with a user of the unknown call. Therefore, the prompting as to incoming call has better flexibility, and better effects are obtained.

Figure 12:
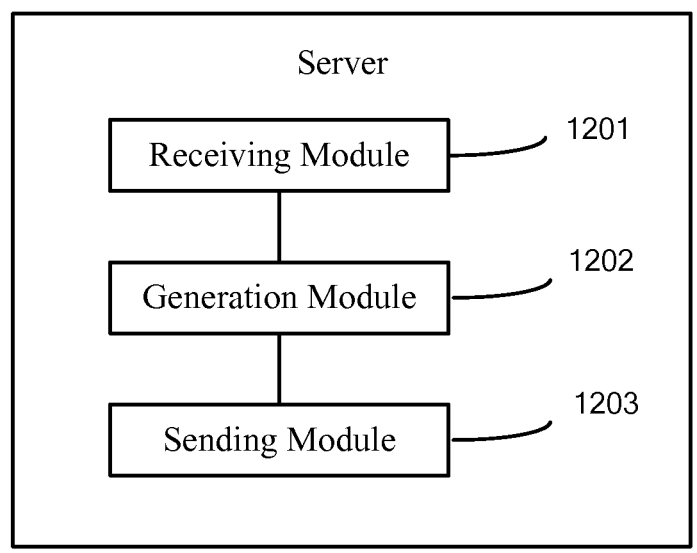
FIG. 12 is a block diagram of a server according to an exemplary embodiment.

FIG. 12 is a block diagram of a server according to an exemplary embodiment. Referring to FIG. 12, the server includes a receiving module 1201, a generation module 1202 and a sending module 1203.

The receiving module 1201 is configured to receive a request for recommending information.

The generation module 1202 is configured to generate recommending information according to the request for recommending information, the recommending information being configured to indicate that a recommender recommends a second telephone number to a terminal affiliated with a first telephone number.

The sending module 1203 is configured to send the recommending information to a second terminal corresponding to the second telephone number according to the second telephone number in the recommending information.

Figure 13:
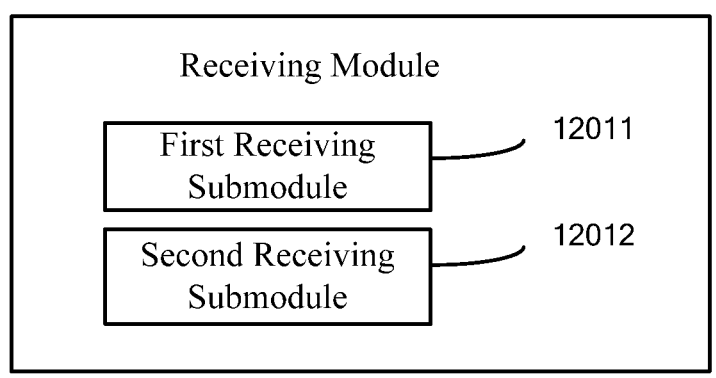
FIG. 13 is a block diagram of a receiving module according to an exemplary embodiment.

In one embodiment, referring to FIG. 13, the receiving module 1201 includes a first receiving submodule 12011 or a second receiving submodule 12012.

The first receiving submodule 12011 is configured to receive the request for recommending information sent by a first terminal corresponding to the first telephone number.

The second receiving submodule 12012 is configured to receive the request for recommending information sent by a third terminal corresponding to the telephone number of the recommender.

Figure 14:
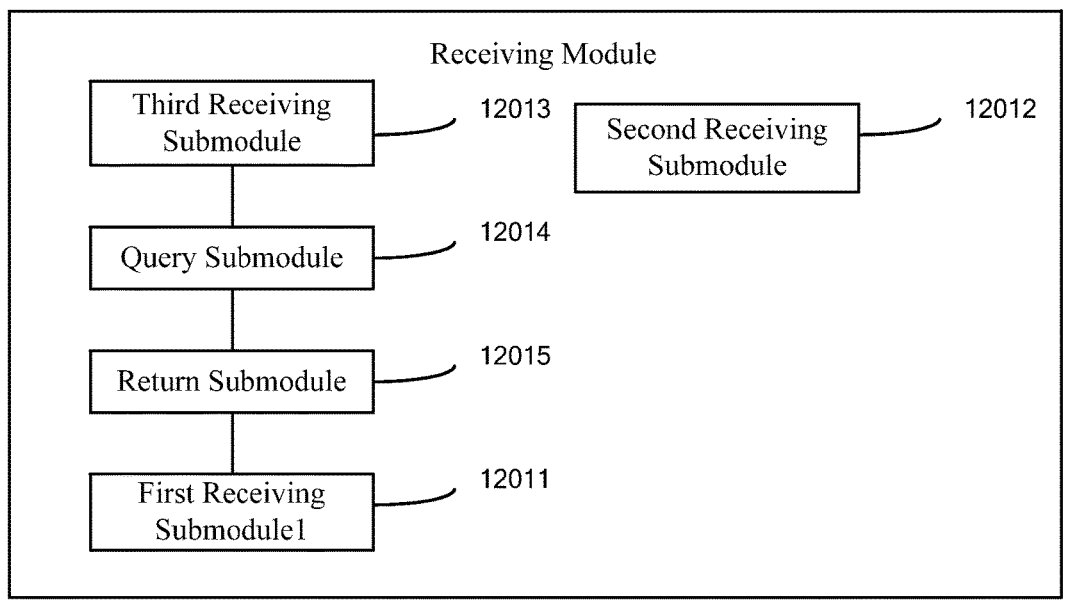
FIG. 14 is a block diagram of a receiving module according to an exemplary embodiment.

In one embodiment, referring to FIG. 14, the receiving module 1201 further includes a third receiving submodule 12013, a query submodule 12014 and a return submodule 12015.

The third receiving submodule 12013 is configured to receive a query request sent by the first terminal corresponding to the first telephone number, the query request including at least the second telephone number.

The query submodule 12014 is configured to query whether a user corresponding to the second telephone number is an online user according to the second telephone number in the query request The return submodule 12015 is configured to return a query result to the first terminal to make the first terminal return the request for recommending information after the first terminal determining that the user corresponding to the second telephone number is an online user.

According to the server provided by embodiments of the present disclosure, the request for recommending information is received, and the recommending information is generated according to the request for recommending information. The recommending information is sent to the second terminal corresponding to the second telephone number according to the second telephone number in the recommending information. Since the second terminal may perform prompting as to the current incoming call according to the recommending information, a user can conveniently communicate with a user of the unknown call. Therefore, the prompting as to incoming call has better flexibility, and better effects are obtained.

Figure 15:
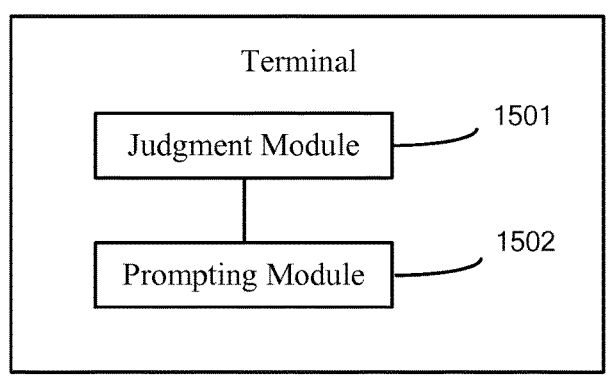
FIG. 15 is a block diagram of a terminal according to an exemplary embodiment.

FIG. 15 is a block diagram of a terminal according to an exemplary embodiment. Referring to FIG. 15, the terminal includes a determination module 1501 and a prompting module 1502.

The determination module 1501 is configured to, when an unknown call is received, determine whether a local information database includes designated recommending information corresponding to the unknown call, the information database being configured to store recommending information sent by a server, and the designated recommending information being configured to indicate that a recommender recommends a second telephone number used by the terminal to a first telephone number.

The prompting module 1502 is configured to, when the information database includes the designated recommending information, perform prompting as to the unknown call according to the designated recommending information.

In one embodiment, the prompting module 1502 is configured to determine whether the recommender in the designated recommending information is in a local contact list according to a telephone number of the recommender in the designated recommending information; and when the recommender in the designated recommending information is in the local contact list, perform prompting as to the unknown call according to information of the recommender.

Figure 16:
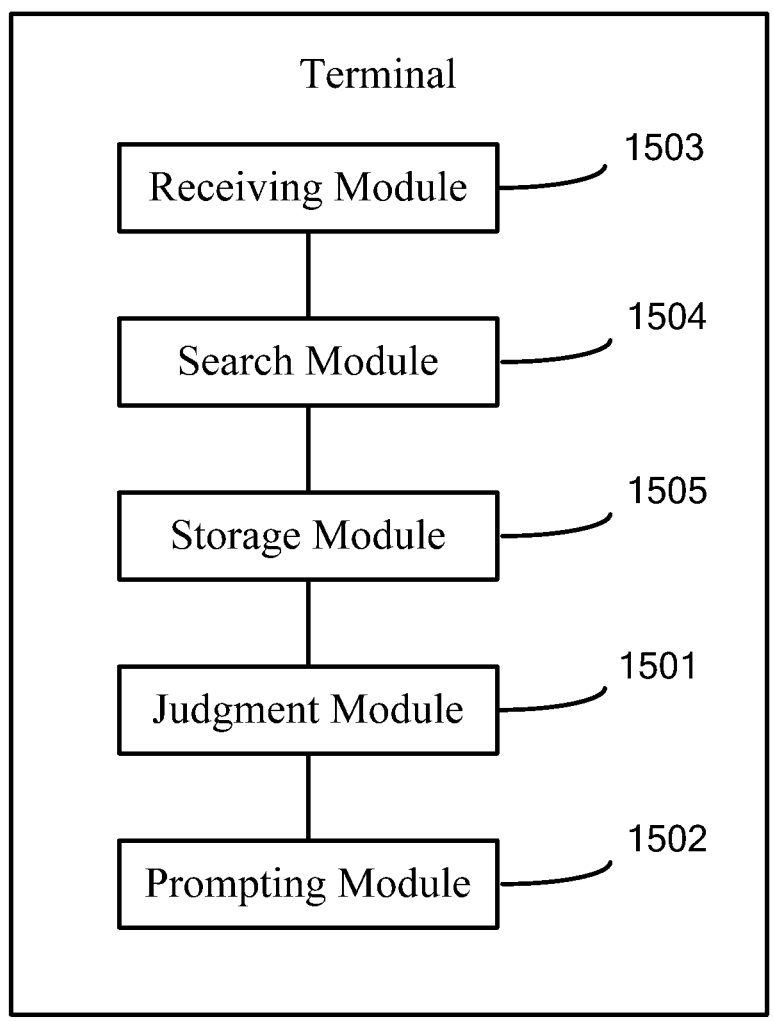
FIG. 16 is a block diagram of a terminal according to an exemplary embodiment.

In one embodiment, referring to FIG. 16, the terminal further includes a receiving module 1503, a search module 1504 and a storage module 1505.

The receiving module 1503 is configured to receive recommending information sent by the server.

The search module 1504 is configured to search whether a telephone number of the recommender in the recommending information is stored in a local contact list.

The storage module 1505 is configured to, when the telephone number of the recommender in the recommending information is stored in the local contact list, store the recommending information in the local information database.

Figure 17:
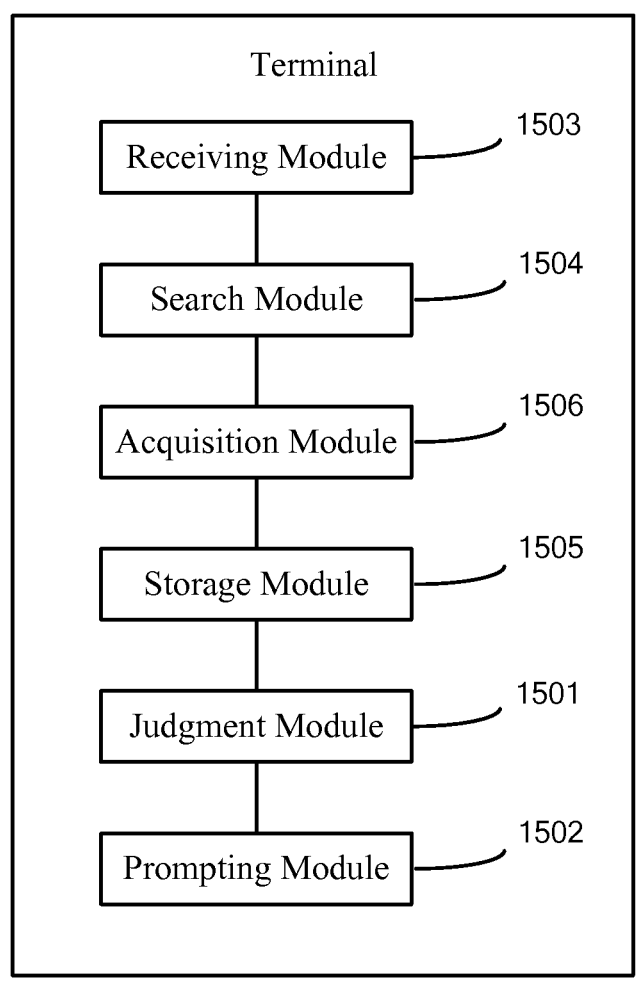
FIG. 17 is a block diagram of a terminal according to an exemplary embodiment.

In one embodiment, referring to FIG. 17, the terminal further includes an acquisition module 1506.

The acquisition module 1506 is configured to acquire expiry time corresponding to the recommending information.

The storage module 1505 is configured to store the recommending information and the expiry time corresponding to the recommending information in the local information database.

Figure 18:
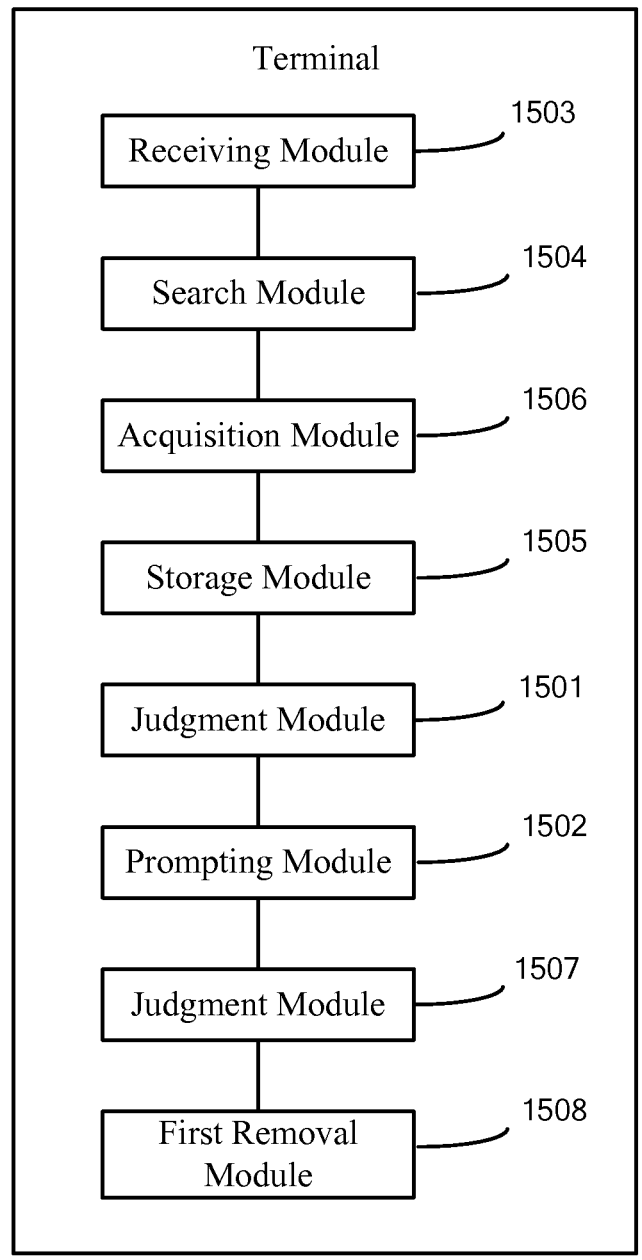
FIG. 18 is a block diagram of a terminal according to an exemplary embodiment.

In one embodiment, referring to FIG. 18, the terminal further includes a determination module 1507 and a first removal module 1508.

The determination module 1507 is configured to determine whether the recommending information is expired according to the expiry time corresponding to the recommending information.

The first removal module 1508 is configured to, when the recommending information is expired, remove the recommending information and the expiry time corresponding to the recommending information from the local information database.

Figure 19:
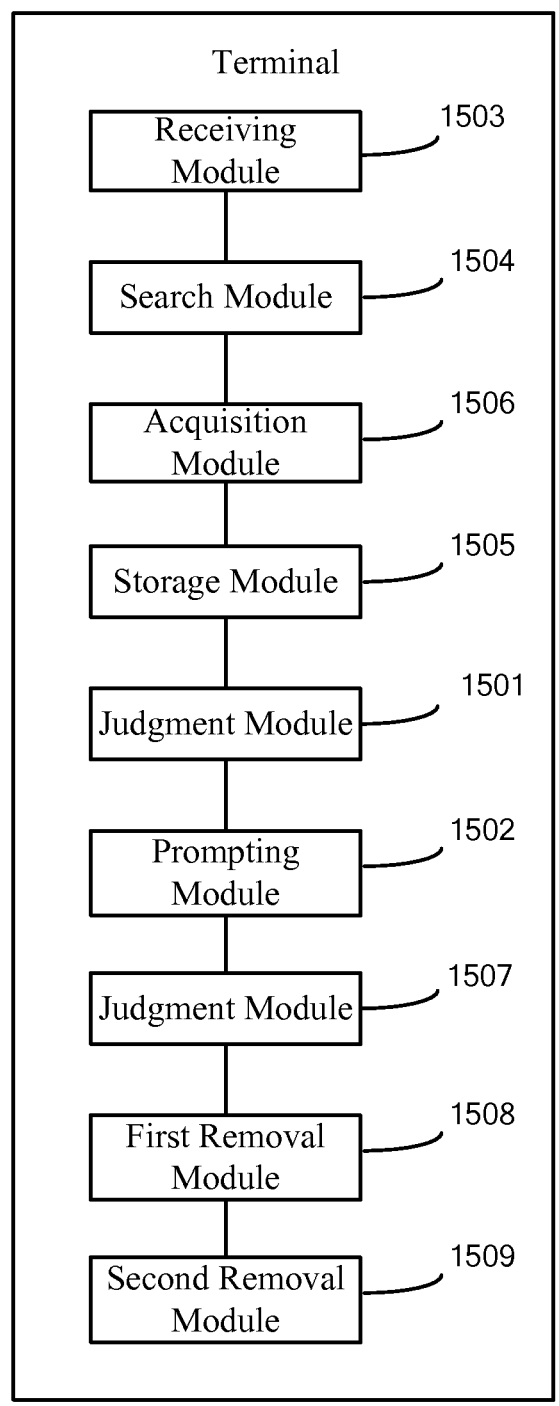
FIG. 19 is a block diagram of a terminal according to an exemplary embodiment.

In one embodiment, referring to FIG. 19, the terminal further includes a second removal module 1509.

The second removal module 1509 is configured to, when it is detected that the first telephone number in the recommending information is stored in the local contact list, remove the recommending information from the information database.

According to the terminal provided by embodiments of the present disclosure, when an unknown call is received, whether the local information database includes the designated recommending information corresponding to the unknown call is determined, and when the information database includes the designated recommending information, prompting as to the unknown call is performed according to the designated recommending information. Since prompting as to the current incoming call may be performed according to the recommending information, a user can conveniently communicate with a user of the unknown call. Therefore, the prompting as to incoming call has better flexibility, and better effects are obtained.

Figure 20:
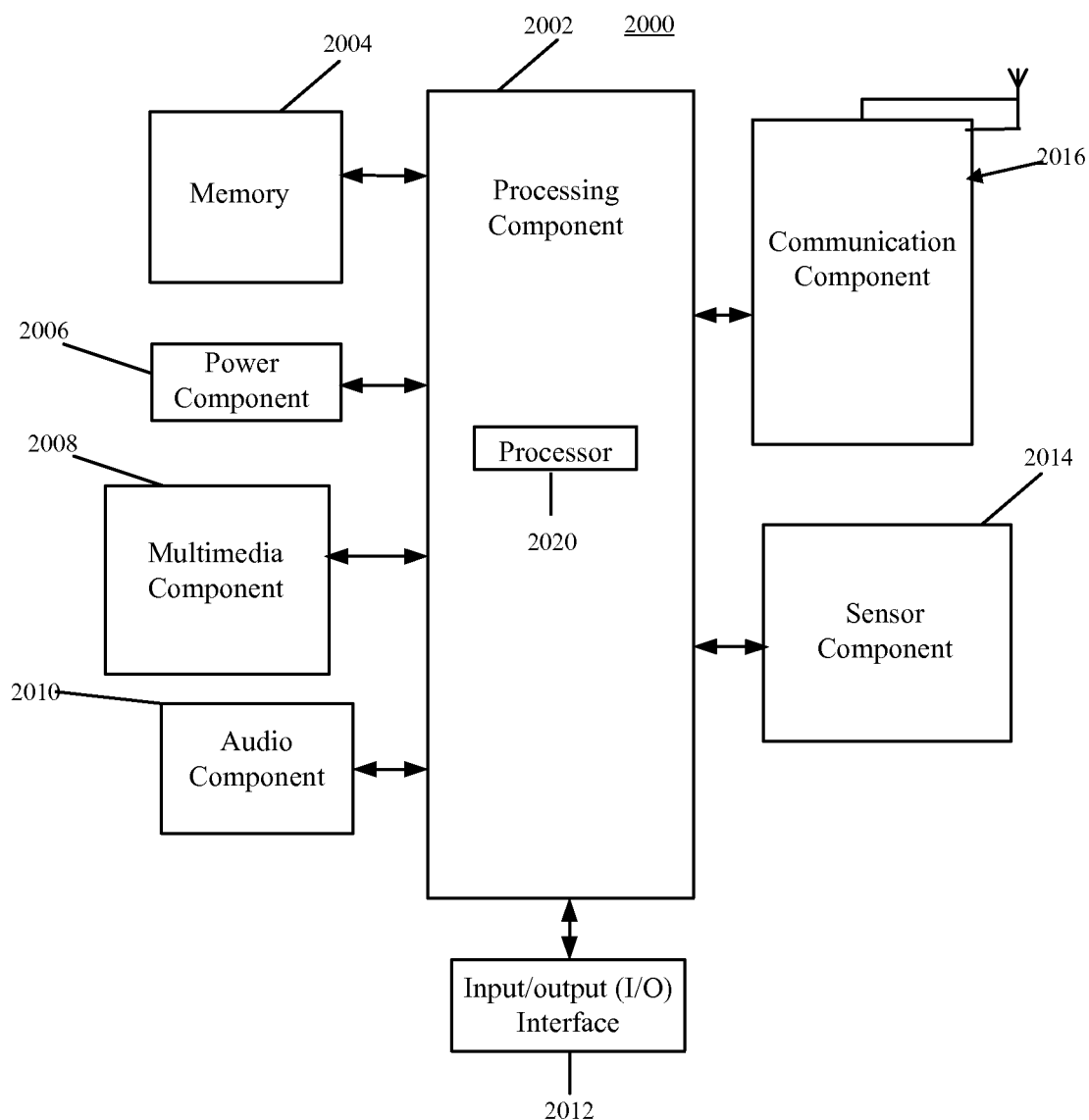
FIG. 20 is a block diagram of a terminal according to an exemplary embodiment.

FIG. 20 is a block diagram of a terminal 2000 according to an exemplary embodiment. For example, the terminal 2000 may be a mobile phone, a computer, a digital broadcast terminal, a messaging device, a gaming console, a tablet, a medical device, an exercise equipment, a personal digital assistant, and the like.

Referring to FIG. 20, the terminal 2000 may include one or more of the following circuitry components: a processing component 2002, a memory 2004, a power component 2006, a multimedia component 2008, an audio component 2010, an I/O (Input/Output) interface 2012, a sensor component 2014, and a communication component 2016.

The processing component 2002 typically controls overall operations of the terminal 2000, such as the operations associated with display, telephone calls, data communications, camera operations, and recording operations. The processing component 2002 may include one or more processors 2020 to execute instructions to perform all or part of the steps in the above described methods. Moreover, the processing component 2002 may include one or more modules which facilitate the interaction between the processing component 2002 and other components. For instance, the processing component 2002 may include a multimedia module to facilitate the interaction between the multimedia component 2008 and the processing component 2002.

The memory 2004 is configured to store various types of data to support the operation of the terminal 2000. Examples of such data include instructions for any applications or methods operated on the terminal 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the terminal 2000. The power component 2006 may include a power management system, one or more power sources, and any other components associated with the generation, management, and distribution of power in the terminal 2000.

The multimedia component 2008 includes a screen providing an output interface between the terminal 2000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2008 includes a front camera and/or a rear camera. The front camera and/or the rear camera may receive an external multimedia datum while the terminal 2000 is in an operation mode, such as a photographing mode or a video mode. Each of the front camera and the rear camera may be a fixed optical lens system or have focus and optical zoom capability.

The audio component 2010 is configured to output and/or input audio signals. For example, the audio component 2010 includes a microphone ("MIC") configured to receive an external audio signal when the terminal 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker to output audio signals.

The I/O interface 2012 provides an interface between the processing component 2002 and peripheral interface modules, such as a keyboard, a click wheel, buttons, and the like. The buttons may include, but are not limited to, a home button, a volume button, a starting button, and a locking button.

The sensor component 2014 includes one or more sensors to provide status assessments of various aspects of the terminal 2000. For instance, the sensor component 2014 may detect an open/closed status of the terminal 2000, relative positioning of components, e.g., the display and the keypad, of the terminal 2000, a change in position of the terminal 2000 or a component of the terminal 2000, a presence or absence of user contact with the terminal 2000, an orientation or an acceleration/deceleration of the terminal 2000, and a change in temperature of the terminal 2000. The sensor component 2014 may include a proximity sensor configured to detect the presence of nearby objects without any physical contact. The sensor component 2014 may also include a light sensor, such as a CMOS or CCD image sensor, for use in imaging applications. In some embodiments, the sensor component 2014 may also include an accelerometer sensor, a gyroscope sensor, a magnetic sensor, a pressure sensor, or a temperature sensor. In some embodiments, the sensor component 2014 may also include an accelerometer sensor, a gyroscope sensor, a magnetic sensor, a pressure sensor, or a temperature sensor.

The communication component 2016 is configured to facilitate communication, wired or wirelessly, between the terminal 2000 and other devices. The terminal 2000 can access a wireless network based on a communication standard, such as WiFi, 2G, or 3G, or a combination thereof. In one exemplary embodiment, the communication component 2016 receives a broadcast signal or broadcast associated information from an external broadcast management system via a broadcast channel. In one exemplary embodiment, the communication component 2016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the function executable by the first terminal of the method for acquiring recommending information provided by the above described embodiment corresponding to FIG. 1 or 4.

According to the terminal provided by embodiments of the present disclosure, the second telephone number sent by the recommender is received, and the request for recommending information is sent to the server according to the first telephone number of the terminal, the telephone number of the recommender and the second telephone number, so that the server generates the recommending information according to the request for recommending information, and pushes the recommending information to the terminal affiliated with the second telephone number. Since the terminal affiliated with the second telephone number may perform prompting as to the current incoming call according to the recommending information, a user can conveniently communicate with a user of the unknown call. Therefore, the prompting as to incoming call has better flexibility, and better effects are obtained.

In exemplary embodiments, there is also provided a non-transitory computer readable storage medium including instructions, such as included in the memory 2004, executable by the processor 2020 in the terminal 2000, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when an instruction in a storage medium is performed by a processor of a terminal, enables the terminal to perform a method for acquiring recommending information. The method includes: receiving a second telephone number sent by a recommender; and sending a request for recommending information to a server according to a first telephone number of the terminal, a telephone number of the recommender and the second telephone number, so that the server generates recommending information according to the request for recommending information, and pushes the recommending information to a terminal affiliated with the second telephone number.

According to the computer readable storage medium provided by embodiments of the present disclosure, the second telephone number sent by the recommender is received, and the request for recommending information is sent to the server according to the first telephone number of the terminal, the telephone number of the recommender and the second telephone number, so that the server generates the recommending information according to the request for recommending information, and pushes the recommending information to the terminal affiliated with the second telephone number. Since the terminal affiliated with the second telephone number may perform prompting as to the current incoming call according to the recommending information, a user can conveniently communicate with a user of the unknown call. Therefore, the prompting as to incoming call has better flexibility, and better effects are obtained.

Figure 21:
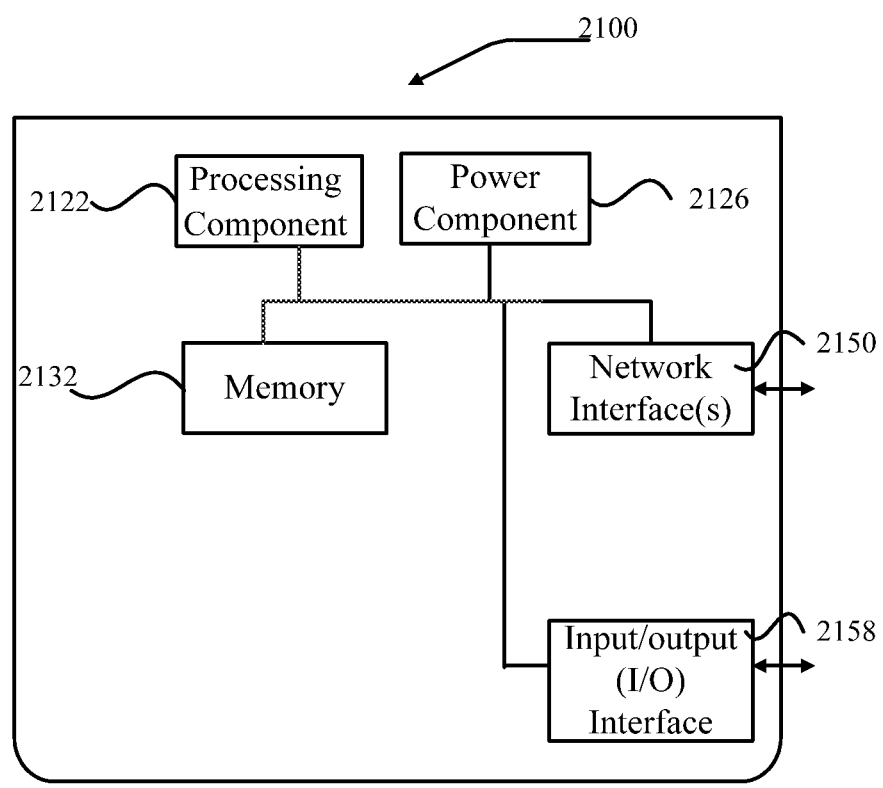
FIG. 21 is a block diagram of a server according to an exemplary embodiment.

FIG. 21 is a block diagram of a server 2100 according to an exemplary embodiment. For example, the server 2100 may be provided as a server. Referring to FIG. 21, the device 2100 includes a processing component 2122, which further includes one or more processors, and memory resources represented by a memory 2132 for storing instructions executable by the processing component 2122, such as application programs. The application programs stored in the memory 2132 may include one or more modules each corresponding to a set of instructions. Further, the processing component 2122 is configured to execute the instructions to perform the function executable by the server in the method for acquiring recommending information provided by the above described embodiments corresponding to FIG. 2 or 4.

The server 2100 may also include a power component 2126 configured to perform power management of the server 2100, wired or wireless network interface(s) 2150 configured to connect the server 2100 to a network, and an input/output (I/O) interface 2158. The server 2100 may operate based on an operating system stored in the memory 2132, such as Windows Server™, Mac OS X™, Unix™, Linux™, FreeBSD™, or the like.

A non-transitory computer readable storage medium, when an instruction in a storage medium is performed by a processor of a terminal, enables the terminal to perform a method for acquiring recommending information. The method includes:

when receiving an unknown call, determining whether a local information database comprises designated recommending information corresponding to the unknown call, the information database being configured to store recommending information sent by a server, and the designated recommending information being configured to indicate that a recommender recommends a second telephone number used by the terminal to a first telephone number; and when the information database includes the designated recommending information, performing prompting as to the unknown call according to the designated recommending information.

The solutions provided by the embodiments of the present disclosure may include the following advantageous effects. When the second terminal receives an unknown call, the second terminal may determine whether the local information database include the designated recommending information corresponding to the unknown call. When the information database includes the designated recommending information, prompting as to the unknown call is performed according to the designated recommending information. Since the prompting as to the current incoming call may be performed according to the recommending information, a user can conveniently communicate with a user of the unknown call. Therefore, the prompting as to an incoming call has better flexibility, and better effects are obtained.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for recommending contact information between terminals, comprising:
   receiving, by a first terminal affiliated with a first telephone number, a message sent by a recommender using a third terminal, the message including a second telephone number affiliated with a second terminal; and
   sending, by the first terminal, a request for recommending information to a server according to the first telephone number of the terminal, a telephone number of the recommender, and the second telephone number, so that the server generates recommending information according to the request for recommending information, and pushes the recommending information to the second terminal for the second terminal to prompt when the first terminal calls the second terminal and the first telephone number is not a contact stored in the second terminal.

2. The method according to claim 1, wherein receiving the second telephone number sent by the recommender comprises:
   when receiving a short message sent by the recommender, performing telephone number identification on the short message; and
   when obtaining a telephone number via the telephone number identification, taking the telephone number extracted and identified from the short message as the second telephone number.

3. The method according to claim 1, wherein receiving the second telephone number sent by the recommender comprises:
   when receiving an application message, performing telephone number identification on the application message; and
   when obtaining a telephone number via the telephone number identification, taking the telephone number extracted and identified from the application message as the second telephone number; and
   the method further comprises:
   acquiring a telephone number bound to a user account from which the application message is sent, and taking the acquired telephone number as the telephone number of the recommender.

4. The method according to claim 1, further comprising:
sending a query request comprising at least the second telephone number to the server to make the server query whether a user corresponding to the second telephone number is an online user according to the query request and return a query result; and
if the query result is that the user corresponding to the second telephone number is an online user, sending the recommending information to the server.

5. The method according to claim 1, further comprising:
when detecting a dialing request to the second telephone number in a current display page, performing the step of sending the request for recommending information to the server.

6. The method according to claim 1, further comprising:
sending expiry time corresponding to the request for recommending information to the server, so that the server determines whether the request for recommending information is expired according to the expiry time, and removes the request for recommending information when the request for recommending information is expired.

7. A terminal affiliated with a first telephone number, comprising:
a processor; and
a memory for storing instructions executable by the processor;
wherein the processor is configured to perform acts comprising:
receiving a message sent by a recommender using a third terminal, the message including a second telephone number; and
sending a request for recommending information to a server according to the first telephone number of the terminal, a telephone number of the recommender and the second telephone number, so that the server generates recommending information according to the request for recommending information, and pushes the recommending information to a terminal for the second terminal to prompt when the first terminal calls the second terminal and the first telephone number is not a contact stored in the second terminal.

8. The terminal according to claim 7, wherein the processor is configured to:
when a short message sent by the recommender is received, perform telephone number identification on the short message; and
when a telephone number is obtained via the telephone number identification, take the telephone number extracted and identified from the short message as the second telephone number.

9. The terminal according to claim 7, wherein the processor is configured to:
when an application message is received, perform telephone number identification on the application message; and
when a telephone number is obtained via the telephone number identification, take the telephone number extracted and identified from the application message as the second telephone number; and
the processor is further configured to:
acquire a telephone number bound to a user account from which the application message is sent, and taking the acquired telephone number as the telephone number of the recommender.

10. The terminal according to claim 7, wherein the processor is configured to:
before sending of the request for recommending information to the server, send a query request comprising at least the second telephone number to the server to make the server query whether a user corresponding to the second telephone number is an online user according to the query request and return a query result; and
if the query result is that the user corresponding to the second telephone number is an online user, perform the step of sending the recommending information to the server.

11. The terminal according to claim 7, wherein the processor is configured to:
when a dialing request to the second telephone number in a current display page is detected, perform the step of sending the request for recommending information to the server.

12. The terminal according to claim 7, wherein the processor is further configured to:
send expiry time corresponding to the request for recommending information to the server, so that the server determines whether the request for recommending information is expired according to the expiry time, and removes the request for recommending information when the request for recommending information is expired.

* * * * *